(12) United States Patent
Avrutsky et al.

(10) Patent No.: US 8,098,055 B2
(45) Date of Patent: Jan. 17, 2012

(54) STEP-UP CONVERTER SYSTEMS AND METHODS

(75) Inventors: Mordechay Avrutsky, Alphai Menashe (IL); Idan Avrutsky, Alphai Menashe (IL); Ron Hadar, Cupertino, CA (US); Shmuel Arditi, Los Gatos, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 755 days.

(21) Appl. No.: 12/202,110

(22) Filed: Aug. 29, 2008

(65) Prior Publication Data

US 2010/0027297 A1 Feb. 4, 2010

Related U.S. Application Data

(60) Provisional application No. 61/137,741, filed on Aug. 1, 2008.

(51) Int. Cl.
*G05F 1/00* (2006.01)
(52) U.S. Cl. .......... 323/222; 323/271; 323/282; 363/65; 363/67
(58) Field of Classification Search .................. 323/222, 323/271, 282, 283; 363/21.12, 65, 67, 68, 363/69, 70, 71
See application file for complete search history.

(56) References Cited

U.S. PATENT DOCUMENTS

| | | | |
|---|---|---|---|
| 4,649,334 A | 3/1987 | Nakajima | |
| 5,235,266 A | 8/1993 | Schaffrin | |
| 5,268,832 A | 12/1993 | Kandatsu | |
| 5,504,418 A | 4/1996 | Ashley | |
| 5,604,430 A | 2/1997 | Decker et al. | |
| 5,648,731 A | 7/1997 | Decker et al. | |
| 5,892,354 A | 4/1999 | Nagao et al. | |
| 5,923,158 A | 7/1999 | Kurokami et al. | |
| 5,929,614 A * | 7/1999 | Copple | 323/222 |
| 6,175,219 B1 | 1/2001 | Imamura et al. | |
| 6,262,558 B1 | 7/2001 | Weinberg | |
| 6,275,016 B1 | 8/2001 | Ivanov | |
| 6,281,485 B1 | 8/2001 | Siri | |
| 6,369,462 B1 | 4/2002 | Siri | |
| 6,448,489 B2 | 9/2002 | Kimura et al. | |
| 6,590,793 B1 | 7/2003 | Nagao et al. | |
| 6,650,031 B1 | 11/2003 | Goldack | |
| 6,765,315 B2 | 7/2004 | Hammerstrom et al. | |

(Continued)

FOREIGN PATENT DOCUMENTS

AU 2005262278 7/2005

(Continued)

OTHER PUBLICATIONS

Philips Semiconductors, Data Sheet PSMN005-55B; PSMN005-55P N-channel logic trenchMOS transistor, Oct. 1999, Product specification, pp. 1-11.*

(Continued)

*Primary Examiner* — Adolf Berhane
*Assistant Examiner* — Nguyen Tran
(74) *Attorney, Agent, or Firm* — Greenberg Traurig, LLP (57) ABSTRACT

Methods and systems with a step-up converter are provided based on a boost converter. In one aspect, a step-up converter includes: a boost converter having a first inductor; a second inductor paired on a core with the first inductor; and a rectifier circuit coupled with the second inductor to generate a direct current output.

17 Claims, 5 Drawing Sheets

U.S. PATENT DOCUMENTS

| | | | |
|---|---|---|---|
| 6,810,339 | B2 | 10/2004 | Wills |
| 6,844,739 | B2 | 1/2005 | Kasai et al. |
| 6,894,911 | B2 | 5/2005 | Telefus et al. |
| 6,914,418 | B2 | 7/2005 | Sung |
| 6,966,184 | B2 | 11/2005 | Toyomura et al. |
| 6,984,970 | B2 | 1/2006 | Capel |
| 7,061,214 | B2 | 6/2006 | Mayega |
| 7,126,053 | B2 | 10/2006 | Kurokami et al. |
| 7,150,938 | B2 | 12/2006 | Munshi et al. |
| 7,158,395 | B2 | 1/2007 | Deng et al. |
| 7,248,946 | B2 | 7/2007 | Bashaw et al. |
| 7,256,566 | B2 | 8/2007 | Bhavaraju et al. |
| 7,276,886 | B2 | 10/2007 | Kinder |
| 7,324,361 | B2 | 1/2008 | Siri |
| 7,432,691 | B2 | 10/2008 | Cutler |
| 7,456,523 | B2 | 11/2008 | Kobayashi |
| 7,518,346 | B2 | 4/2009 | Prexl |
| 7,538,451 | B2 | 5/2009 | Nomoto |
| 7,595,616 | B2 | 9/2009 | Prexl |
| 7,605,498 | B2 | 10/2009 | Ledenev et al. |
| 7,629,708 | B1 | 12/2009 | Meyers et al. |
| 7,709,727 | B2 | 5/2010 | Roehrig et al. |
| 7,719,140 | B2 | 5/2010 | Ledenev et al. |
| 7,768,244 | B2 | 8/2010 | Perol |
| 7,778,056 | B2 * | 8/2010 | Geissler ............................ 363/89 |
| 2003/0156439 | A1 * | 8/2003 | Ohmichi et al. ................. 363/98 |
| 2004/0207366 | A1 | 10/2004 | Sung |
| 2005/0041442 | A1 * | 2/2005 | Balakrishnan ................... 363/44 |
| 2005/0057214 | A1 | 3/2005 | Matan |
| 2005/0057215 | A1 | 3/2005 | Matan |
| 2005/0162018 | A1 | 7/2005 | Realmuto et al. |
| 2005/0172995 | A1 | 8/2005 | Rohrig et al. |
| 2005/0213272 | A1 | 9/2005 | Kobayashi |
| 2005/0275386 | A1 | 12/2005 | Jepsen et al. |
| 2006/0001406 | A1 | 1/2006 | Matan |
| 2006/0017327 | A1 | 1/2006 | Siri et al. |
| 2006/0174939 | A1 | 8/2006 | Matan |
| 2006/0176031 | A1 * | 8/2006 | Forman et al. ................. 323/267 |
| 2006/0185727 | A1 | 8/2006 | Matan |
| 2007/0024257 | A1 | 2/2007 | Boldo |
| 2007/0044837 | A1 | 3/2007 | Simburger et al. |
| 2007/0103108 | A1 | 5/2007 | Capp et al. |
| 2007/0133241 | A1 | 6/2007 | Mumtaz et al. |
| 2007/0164612 | A1 | 7/2007 | Wendt et al. |
| 2007/0273351 | A1 | 11/2007 | Matan |
| 2008/0036440 | A1 | 2/2008 | Garmer |
| 2008/0097655 | A1 | 4/2008 | Hadar et al. |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0143188 | A1 | 6/2008 | Adest et al. |
| 2008/0147335 | A1 | 6/2008 | Adest et al. |
| 2008/0150366 | A1 | 6/2008 | Adest et al. |
| 2008/0150484 | A1 | 6/2008 | Kimball et al. |
| 2008/0164766 | A1 * | 7/2008 | Adest et al. ...................... 307/80 |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0303503 | A1 | 12/2008 | Wolfs |
| 2009/0069950 | A1 | 3/2009 | Kurokami et al. |
| 2009/0150005 | A1 | 6/2009 | Hadar et al. |
| 2010/0026097 | A1 | 2/2010 | Avrutsky |

FOREIGN PATENT DOCUMENTS

| | | |
|---|---|---|
| DE | 4232356 | 3/1994 |
| DE | 19961705 | 7/2001 |
| EP | 1388774 | 2/2004 |
| ES | 2249147 | 3/2006 |
| JP | 2003102134 | 4/2003 |
| KR | 20080065817 | 7/2008 |
| WO | 03012569 | 2/2003 |

OTHER PUBLICATIONS

Palma, L et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Roman, Eduardo, et al., "Intelligent PV Module for Grid-Connectred PV Systems," IEEE Transactions on Industrial Electronics, vol. 53, No. 4, pp. 1066-1073, Aug. 2006.

Walker, Jeffrey R. et al., "Cascaded DC-DC Converter Connection of Photovoltaic Modules," IEEE Transactions on Power Electronics, vol. 19, No. 4, pp. 1130-1139, Jul. 2004.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application PCT/US08/75127, International Search Report and Written Opinion (mailed Apr. 28, 2009).

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Baek, Ju-Won et al., "High Boost Converter using Voltage Multiplier," 2005 IEEE Conference, IECON 05, pp. 567-572, Nov. 2005.

Wikimedia Foundation, Inc., "Electric Power Transmission," located at http://web.archive.org/web/20041210095723/en.wikipedia.org/wiki/Electric_power_transmission, Nov. 17, 2004.

Transaction History of related U.S. Appl. No. 11/875,799, filed Oct. 19, 2007, entitled "Method and System to Provide a Distributed Local Energy Production System and High-Voltage DC Bus.".

Transaction History of related U.S. Appl. No. 12/392,042, filed Feb. 24, 2009, entitled "Method and System to Provide a Distributed Local Energy Production System and High-Voltage DC Bus.".

Transaction History of related U.S. Appl. No. 12/340,540, filed Dec. 19, 2008, entitled "System to Connect Multiple Direct Current Energy Sources to an Alternating Current System.".

* cited by examiner

STEP-UP CONVERTER SYSTEMS AND METHODS

RELATED APPLICATIONS

The present application claims priority to provisional U.S. patent application Ser. No. 61/137,741, filed on Aug. 1, 2008 and entitled "Method and System of New Topology for Enhanced Ultra-Low-Cost, High-Efficiency, DC-to-DC Step-up Converter," the disclosure of which is hereby incorporated herein by reference.

FIELD OF THE TECHNOLOGY

At least some embodiments disclosed herein relate to voltage conversion in general and, more particularly but not limited to, voltage conversion for direct current energy sources, such as solar panels, fuel cells, etc.

BACKGROUND

Solar panels and other kinds of energy sources produce variable voltages, which, depending on the type of panel, may range anywhere from 10 to 60 volts (and to 70 volts in some instances). It is known to the inventors that there are efforts to combine solar panels with a high-voltage bus (e.g., in the 200 to 600 volt range), which may be implemented via step-up converters that have an output voltage larger than its input voltage.

A discussion of some current DC-to-DC converter topologies can be found on the web site http://www.boostbuck.com/, which includes discussions of boost-buck switching converter, Cuk Converter, Coupled Inductor Cuk Converter, and Integrated Magnetics Cuk Converter. Other topologies for direct current voltage conversion include boost converter, buck converter, flyback converter, etc.

A boost converter typically includes at least two switches, such as a diode and a transistor, and at least one energy storage element, such as an inductor. The transistor is used to periodically connect the energy source directly to the energy storage element to store energy into the energy storage element; and the energy storage element causes the converter to output a voltage higher than its input DC voltage. Filters made of capacitors can be added to the output of the converter to reduce changes in its output voltage. The diode prevents the electric current in the output from flowing backwards.

However, one of the problems with existing direct current to direct current (DC-to-DC) converters is that in some cases their low efficiency may erase a good part of the gains made by using a high-voltage bus.

What is needed is an ultra-high-efficiency, DC-to-DC step-up converter that allows voltages to be transformed for a high-voltage bus typically in the 100 to 600 volt range, and that at the same time uses a very few low-cost components.

SUMMARY OF THE DESCRIPTION

Methods and systems with a step-up converter based on a boost converter are described herein. Some embodiments are summarized in this section. In one aspect, a step-up converter includes: a boost converter having a first inductor; a second inductor paired on a core with the first inductor; and a rectifier circuit coupled with the second inductor to generate a direct current output.

In one embodiment, the rectifier circuit includes a half bridge rectifier circuit. The half bridge rectifier circuit may include a first diode and a first capacitor connected to the second inductor to form a loop to allow electric current to go through the inductor in a first direction; and a second diode and a second capacitor connected to the second inductor to from a loop to allow electric current to go through the inductor in a second direction.

In one embodiment, the boost converter provides a first portion of a voltage output of the step-up converter; and the rectifier circuit provides a second portion of the voltage output of the step-up converter. The first portion and the second portion of the voltage output of the step-up convert are proportional to a ratio between the first inductor and the second inductor.

In one embodiment, the boost converter further includes a transistor to implement a switch in the boost converter; the voltage output of the step-up converter is higher than 100 volts; and the transistor has a breakdown voltage lower than 100 volts. In one embodiment, the breakdown voltage of the transistor is lower than 75 volts.

In one embodiment, the between drain source connection in the transistor is less than ten milliohms when the transistor is in a saturated on mode; and the output voltage of the boost converter is no more than 50 volts.

In one embodiment, the boost converter further comprises a transistor to implement a switch in the boost converter and a microprocessor coupled to the transistor to control the switch. The microprocessor may be configured to control the switch to adjust an output voltage of the step-up converter.

In one embodiment, the input to output voltage ratio of the step-up converter is higher than 1:8.

In one embodiment, outputs of the boost converter and the rectifier circuit are connected in serial.

In another aspect, a solar panel includes: at least one solar cell to generate a direct current input; a boost converter having a first inductor, the boost converter to receive the direct current input from the at least one solar cell and to generate a first portion of a direct current output; a second inductor paired on a core with the first inductor; and a rectifier circuit coupled with the second inductor to generate a second portion of the direct current output.

In one embodiment, the direct current output has a voltage no less than 200 volts; and the boost converter operates under 100 volts.

In another aspect, an energy system includes: a plurality of direct current energy sources; a voltage bus; and at least one step-up converter coupled between the direct current energy sources and the voltage bus, the step-up converter comprising a boost converter having a first inductor, a second inductor paired on a core with the first inductor, a half bridge rectifier circuit coupled with the second inductor, outputs of boost converter and the half bridge rectifier circuit being connected in serial to power the voltage bus.

In one embodiment, the voltage bus has a voltage equal to or above 200 volts; and the boost converter operates under 50 volts. The energy sources may include solar panels; and the boost converter may include a trench transistor having less than ten milliohms in resistance between drain source when the transistor is in on mode.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
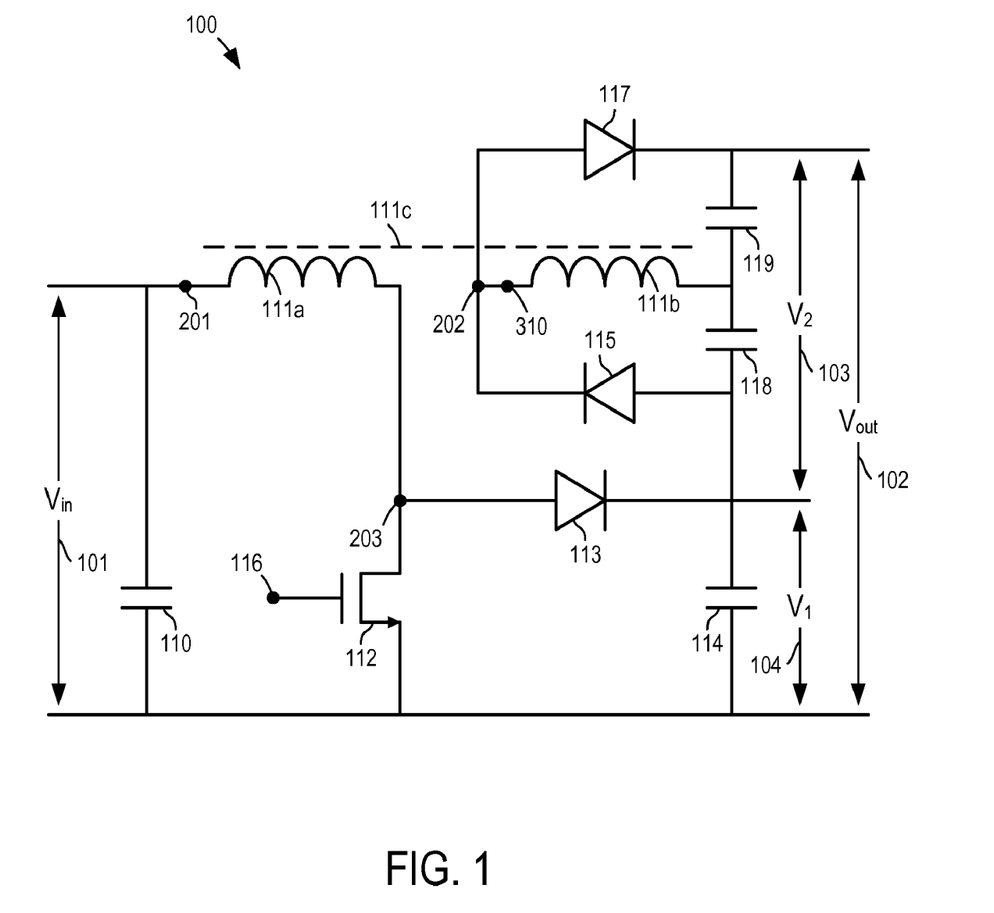
FIG. 1 shows a converter according to one embodiment.

FIG. 1 shows a converter according to one embodiment. As opposed to other technologies, such as the boostbuck or other similar technologies, the converter 100 illustrated in FIG. 1 has significant advantages, which will be discussed below.

In FIG. 1, the step-up converter 100 includes a boost converter section, including an inductor 111a, a transistor 112, and a diode 113. The booster converter section applies a regular, typical boost converter approach to generate the voltage 104, $V_1$, which is higher than the input voltage 101, $V_{in}$, of the step-up converter.

In the boost converter section, the transistor 112 is controlled by the control voltage 116 to periodically connect the inductor 111a to the input voltage $V_{in}$ to store energy into the inductor and to disconnect the inductor 111a from the input voltage $V_{in}$ to release energy and thus power the output. When the transistor 112 is in on mode, energy is stored into the inductor 111a to increase the electric current in the inductor 111a; when the transistor 112 is in off mode, energy is released from the inductor 111a to direct the electric current to the output via the diode 113. The diode 113 is used to create a rectified output voltage $V_1$.

In FIG. 1, capacitors 110 and 114 are used as filters in the input and output portions of the boost converter section to reduce voltage changes.

In one embodiment, the voltage V1 of the output of the booster converter section is typically kept at 50 volts or below, allowing the use of a very highly efficient transistor 112 that has low resistance between drain source connection when the transistor 112 is in saturated on mode (i.e., low RDS-on), such as trench transistors.

In the 50-volt or below operational range, the transistor 112 may typically have a breakdown voltage of 75V-100V and very few milliohms of RDS-on (resistance between drain source connection when the transistor is running in saturated on mode). This low ratio between breakdown voltage and operation voltage is due in large part to the clean waveforms produced by the design of the converter 100 and the resulting low spikes or ringing associated with it.

However, the boost converter section alone, having a very typical design, may result in lots of noise on the output voltage $V_1$ and also in some cases considerable noise on the input voltage $V_{in}$.

Further, to produce an output voltage above 50 volts using the booster converter section along, a high-voltage type of transistor would be used to implement the transistor 112. However, high-voltage transistors are expensive and have high RDS-on.

Once the breakdown voltage of the transistor 112 voltage exceeds 100 volts, the RDS-on is in the high 10s or even 100s of milliohms, affecting the efficiency dramatically. For example, when the power to be converted is in the high 10s or low 100s of watts, the electric currents can exceed 10 amps. Increasing the RDS-on from a few milliohms to a few hundred milliohms can therefore increase losses by 10 times or more for the converter.

Further, high voltage peaks require additional components, such as snubbing networks, diodes, and other components to protect the circuitry and reduce noise, all of which result in additional energy losses in the circuitry.

In FIG. 1, another inductor 111b is connected to a half bridge rectifier circuit to generate another rectified output voltage $V_2$. The inductor 111a and the inductor 111b are paired on the same core 111c, which has a slight air gap in one embodiment, to transfer energy via inductive coupling. The half bridge rectifier circuit includes diodes 115 and 117 and capacitors 118 and 119 to provide a multiplier voltage from the energy drawn from the inductor 111b.

In FIG. 1, the capacitor 118, the diode 115, and the inductor 111b are used to form a path for electric current flowing in one direction in the inductor 111b and drive a voltage output; and the diode 117, the capacitor 119 and the inductor 111b are used to form another path for electric current flowing in another direction in the inductor 111b.

In FIG. 1, the rectified output voltages $V_1$ and $V_2$ are connected in serial to provide the output voltage $V_{out}$ of the convert.

In one embodiment, the inductor 111b has a 1:n ratio to inductor 111a, resulting in a second boost voltage 103, $V_2$, which has the same 1:n ratio to the first boost voltage 103, $V_1$, which was the nominal output voltage. Since the two inductors 111a and 111b are coupled, electric current is taken out of the core 111c both during conduction and during flyback of the transistor 112 (when the transistor 112 is switched off), resulting in much less ripple on the output voltage and in much better use of the flux capabilities of core 111c.

The converter 100 can be used as a highly reliable, low-cost add-on to solar panels and other energy sources, such as water- or wind-generators, fuel cells, etc.

Although FIG. 1 illustrates the use of a half bridge rectifier circuit to generate a direct current output from the inductor 111b, other types of known rectifier circuits can also be used.

Figure 2:
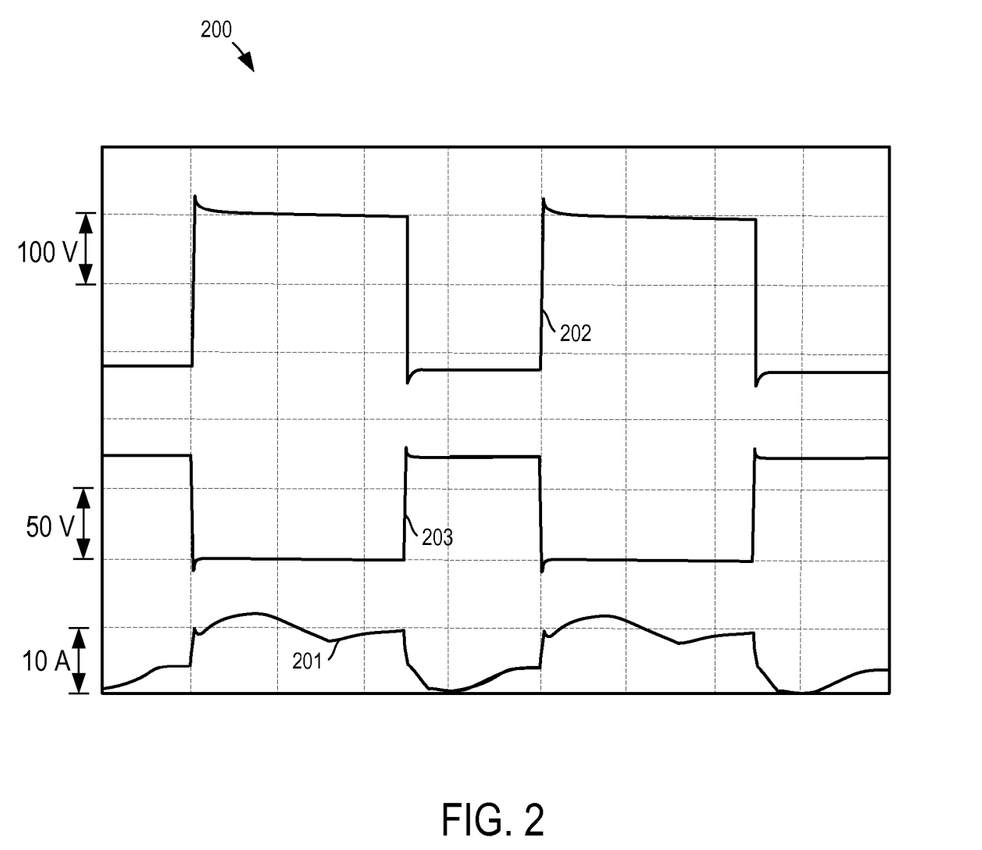
FIGS. 2-3 illustrate waveforms in various locations in the converter illustrated in FIG. 1.
Figure 3:
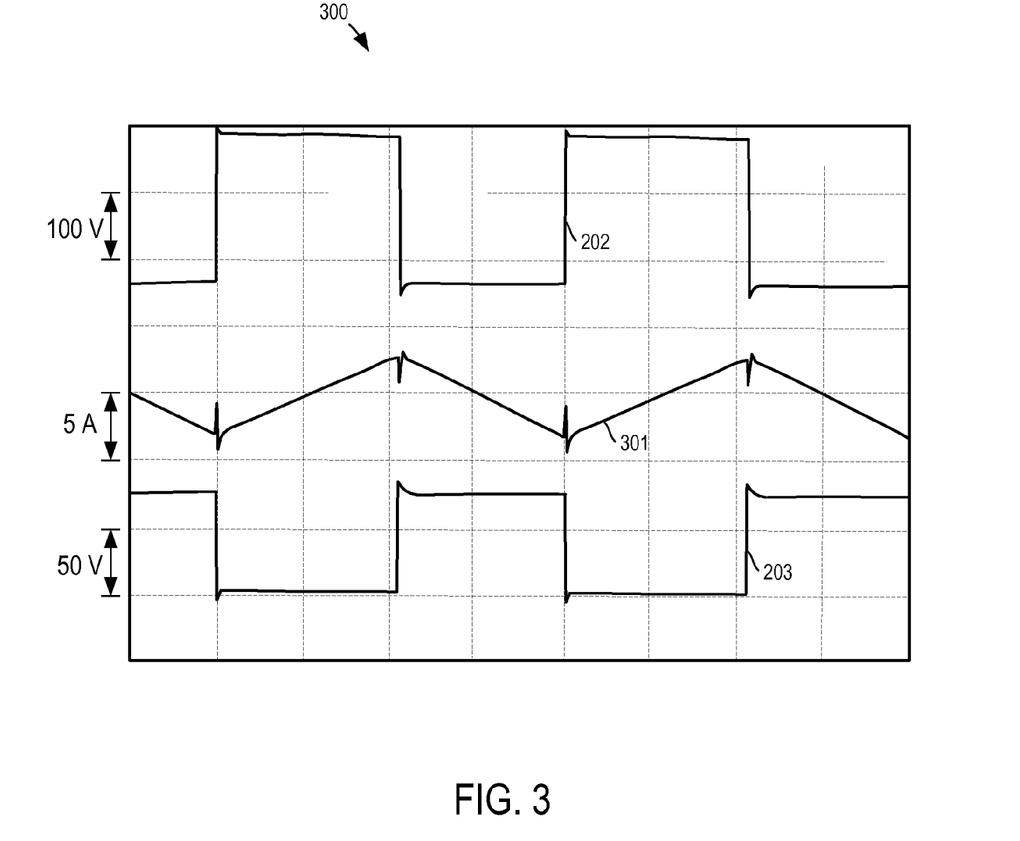

FIGS. 2-3 illustrate waveforms at various locations in the converter illustrated in FIG. 1.

The input current at the point 201 in FIG. 1, after the input filter capacitor 110 and before the inductor 111a, is illustrated as the waveform 201 in FIG. 2. The drain voltage on the transistor 112 at the point 203 in FIG. 1 is illustrated as the waveform 203 in FIGS. 2 and 3. The output rectifier voltage across diode 115 at the point 202 in FIG. 1 is illustrated as the waveform 202 in FIGS. 2 and 3.

In FIG. 3, the electric current measured at the points 201 and 310 in FIG. 1 are combined and illustrated as one waveform 301, which shows the core current adjusted for the ratio of inductor 111b and 111a, coupled with core 111c. The waveform 301 of electric current can be measured using an n-factor current probe at the point 310 in FIG. 1 and the standard current probe at the point 201 in FIG. 1, thus allowing compensation for the higher voltage of 111b.

In the example illustrated in FIG. 2, the nominal input voltage $V_{in}$ is 30 volts; the nominal output voltage $V_{out}$ is 300 volts; the nominal output power is 180 watts.

Figure 5:
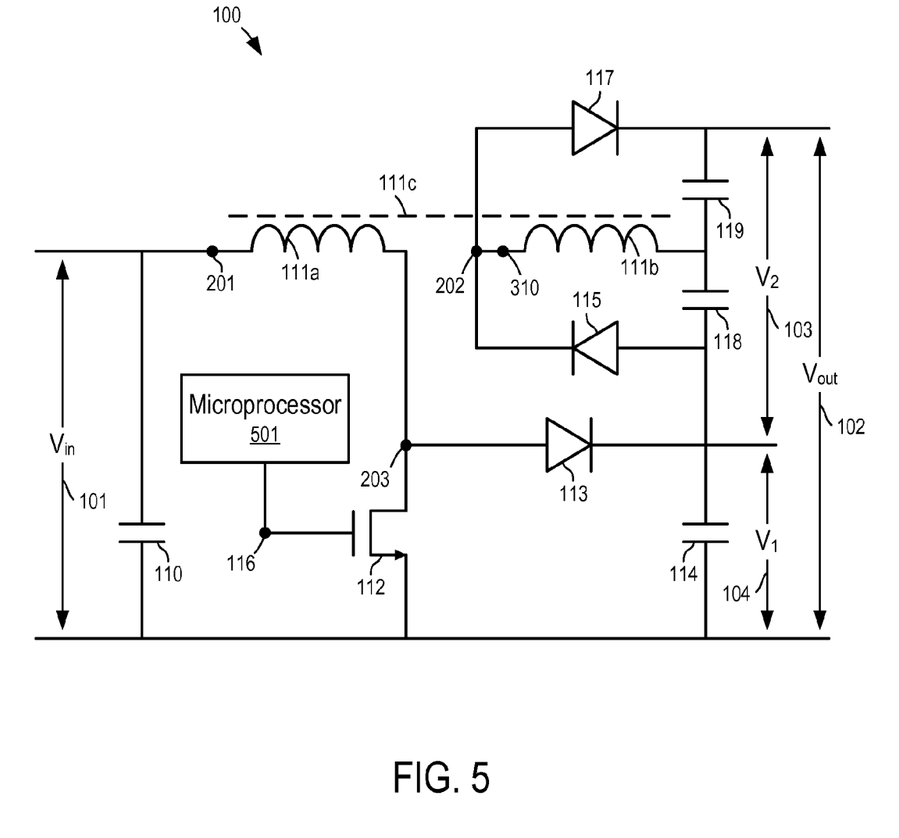
FIG. 5 shows a converter according to one embodiment.

The resulting simplicity of the circuit for the converter 100 is very interesting. In many cases, a simple square wave may be used, because the output voltage is very stable and it does not necessarily require regulation. However, in some cases the control circuitry (not shown in FIG. 1) for supplying the control voltage 116 is not merely a simple square wave;

rather, it may have a fine tuning adjustment to fine tune the output voltage 102, according to certain load situations. For example, negative impedance may be desired in some cases to make the bus more stable; or, current fallback for short circuits situations, etc., may also be desired and may be added using known control technologies for control circuitry (not shown in FIG. 1) that supplies the control voltage 116. Control voltage 116 could be even controlled by a simple microprocessor 501 illustrated in FIG. 5, because the square wave frequency may be relatively low. The frequency mainly depends on the inductor flux capabilities, etc. Since the circuit illustrated in FIG. 2 has very few components, the diode 113 and transistor 112 are low-voltage components, and the switching speed is relatively slow, no expensive components are needed. Thus, the converter 100 permits building a circuitry very inexpensively and integrating it easily into a solar panel or other device designed for field use.

In one aspect, for example, the input voltage or voltage range is defined to calculate the turn ratio. In the case of the exemplary embodiment discussed above, the input voltage would be 16 to 50 volts. Then a suitable boost-voltage $V_1$ measured at the cathode of diode 113 is selected. This selection is affected by such considerations as component ratings, duty cycle, input voltage range, etc. In this example, 100V components allow $V_1$ to reach safely 75V. This approach also achieves a duty cycle of approximately 50 percent for best transformer operation. In this example, the duty cycle would be approximately 53 percent at 35V. The turn ratio N may then be determined according to the desired output voltage $V_{out}$. It can be calculated based on $V_{out}=V_1/(N+1)$. In this example with N=3 it follows that $V_{out}=V_1+3 V_1$. If $V_1$ is 75V, then $V_{out}=300V$.

As illustrated in FIG. 3, the inductor total current is identical to that of a regular boost converter. Current changes ΔI calculation is chosen such that peak inductor current is lower than 1.5×I on average (ΔI<$I_{avg}$). Average current $I_{avg}=P_{in}$(max)/$V_{in}$(min), where $P_{in}$(max) is the maximum input power (e.g., 200 W/30V=6.7 A). In this example, ΔI~6 Ap-p. At ΔI=6 A, the inductivity of the transformer L~60 μH. Further L=$T_{on}$×$V_{in}$/ΔI=12 μS×30/6=60 μH, which may be calculated in an iterative cycle, that means ΔI, inductor value and final number of turns number of turns per layer and outputs location on the transformer may not come at first iteration. In one embodiment, the core 111c has 1 mm gap. For example, one can use an air gap instead but to make it simpler, it is easier to specify the shelf air gap.

Peak current=$I_{in}$(avg)+0.5 ΔI=6.7 A+3 A<10 A. For these conditions AL of 400 nH/$T^2$ a potcore with 42×29 mm dimensions can be chosen. A sandwich construction of layers is recommended for performance. In one embodiment, the following arrangement is used: three sets of primary 13T, secondary 13T, with all primary windings in parallel connection and all secondary in serial connection. In one embodiment, primary is 38#x60 litz wire; and secondary is 38#x40 litz wire.

The forward boost versus regular boost has additional current during ON, and the inductor discharge reflected to the input filter is smaller by 1/N than regular boost. Therefore the RMS ripple current behaves according to $\sqrt{D.C}×I_{in}$(average). Capacitors can be chosen according to this requirement. In this example, 3×10 μF/100V are used. For example, in a worst case we assume all ripple current flows through input filter capacitor and capacitor rated to handle this current. Therefore, $I_{rms}=\sqrt{0.6×6.7}$~5.2 A; each cap can handle 3 A RMS.

As a result of the high voltage output, current is comparably low and $I_{out}$(rms)<$I_{out}$(av). In this example, 2 μF per "branch" covers the filtering needs. Additional capacitance and filtering may be needed as a result of the application.

The advantages of the circuit as illustrated in FIG. 1 are numerous. The switching transistor 112 can be implemented by low voltage (100V), similar to a transistor based on trench technology. The diode 113 can be implemented by a 100V Schottky diode. The operation duty cycle can be set around 50 percent, allowing stable control operation versus a conventional boost performing the same function and other topologies. Wave forms are well clamped, avoiding energy losses and the need for snubbers and stress that cause reliability loss. Switching losses are minimal (about quarter in comparison to regular boost). Over all part count is small; and the circuit works with average mode control and a wide input voltage range.

In some cases, the current waveform is not ramp, so peak current mode can not work only voltage mode or average current mode. Peak pulse current limit can function but as protection only. Because it is a boost type the converter 100 can have large input voltage range.

The converter 100 has various applications, including middle power rating for conversion of Photovoltaic (PV) voltage to bus voltage (e.g., 200V), or any topology that needs a conversion ratio of input to output higher then 1:8. Another application is a situation where input current is limited (e.g., as in Photovoltaic modules), or other cases that may need serial current limit protection.

Figure 4:
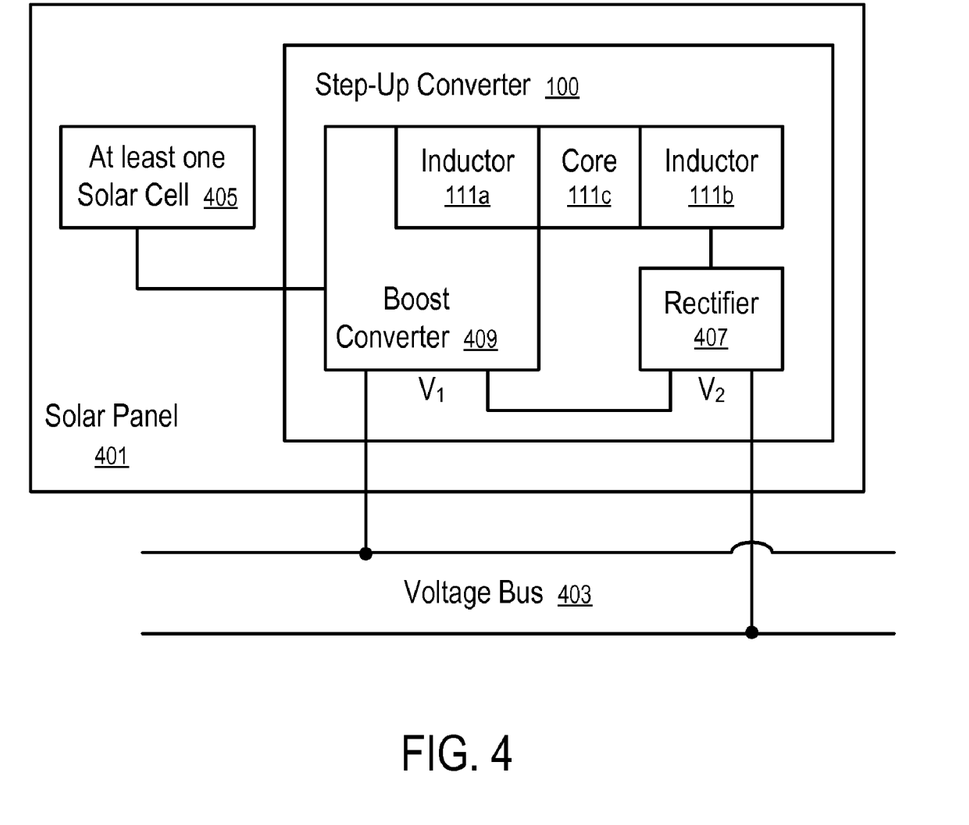
FIG. 4 shows an energy system according to one embodiment.

FIG. 4 shows an energy system according to one embodiment. In FIG. 4, the system includes at least one solar panel 401 connected to a voltage bus 403 that has a voltage above 100 volt (e.g., at 200V). At least one solar cell 405 and a step-up converter 100 are integrated on the solar panel. The solar cell 405 is connected to the boost converter 409, which has a first inductor 111a to generate a first voltage $V_1$. The first inductor 111a and a second inductor 111b are inductively coupled via the core 111c. The rectifier 407 is coupled to the second inductor 111b to generate a second voltage $V_2$. The first voltage $V_1$ generated from the booster converter 409 and the second voltage $V_2$ generated from the rectifier 407 are connected in serial to power the voltage bus 403.

In one embodiment, the booster converter 409 is implemented using a trench transistor 112, a Schottky diode 113 and the inductor 111, as illustrated in FIG. 1.

In one embodiment, the rectifier 407 is implemented using a half bridge rectifier having diodes 115 and 117 and capacitors 118 and 119, as illustrated in FIG. 1.

In one embodiment, the booster converter 409 further includes filters, such as those implemented using capacitors 110 and 114 as illustrated in FIG. 1.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A step-up converter, comprising:
    a boost converter having a first inductor; a second inductor paired on a core with the first inductor; and a half bridge rectifier circuit coupled with the second inductor to generate a direct current output across an output capacitor; wherein the half bridge rectifier circuit comprises:
    a first diode and a first capacitor connected to the second inductor to form a first loop to allow electric current to go through the inductor in a first direction; and a second diode and a second capacitor connected to the second inductor to form a second loop to allow electric current to go through the inductor in a second direction, wherein the first and second capacitors are series connected with the output capacitor and the direct current output is taken across the series connected first, second and output capacitors.

2. The step-up converter of claim 1, wherein the boost converter provides a first portion of a voltage output of the step-up converter; and the rectifier circuit provides a second portion of the voltage output of the step-up converter.

3. The step-up converter of claim 2, wherein the first portion and the second portion of the voltage output of the step-up converter are proportional to a ratio between the first inductor and the second inductor.

4. The step-up converter of claim 1, wherein the boost converter further comprises a transistor to implement a switch in the boost converter, the voltage output of the step-up converter being higher than 100 volts, and the transistor having a breakdown voltage lower than 100 volts.

5. The step-up converter of claim 4, wherein the breakdown voltage of the transistor is lower than 75 volts.

6. The step-up converter of claim 4, wherein resistance between drain/source connection in the transistor is less than ten milliohms when the transistor is in a saturated on mode.

7. The step-up converter of claim 4, wherein an output voltage of the boost converter is no more than 50 volts.

8. The step-up converter of claim 1, wherein the boost converter further comprises a transistor to implement a switch in the boost converter and a microprocessor coupled to the transistor to control the switch.

9. The step-up converter of claim 8, wherein the microprocessor is configured to control the switch to adjust an output voltage of the step-up converter.

10. The step-up converter of claim 1, wherein input to output voltage ratio of the step-up converter is higher than 1:8.

11. A solar panel, comprising:
at least one solar cell to generate a direct current input;
a boost converter having a first inductor, the boost converter to receive the direct current input from the at least one solar cell and to generate a first portion of a direct current output;
a second inductor paired on a core with the first inductor; and
a rectifier circuit coupled with the second inductor to generate a second portion of the direct current output, wherein the rectifier circuit comprises:

a first diode and a first capacitor connected to the second inductor to form a first loop to allow electric current to go through the inductor in a first direction; and
a second diode and a second capacitor connected to the second inductor to form a second loop to allow electric current to go through the inductor in a second direction, wherein the first and second capacitors are series connected with the first portion of the direct current output; and wherein the first and second portions are series connected and the direct current output is taken across the series connected first and second portions together.

12. The solar panel of claim 11, wherein the direct current output has a voltage no less than 200 volts.

13. The solar panel of claim 12, wherein the boost converter operates under 100 volts.

14. An energy system, comprising:
a plurality of direct current energy sources;
a voltage bus; and
at least one step-up converter coupled between the direct current energy sources and the voltage bus, the step-up converter comprising a boost converter having a first inductor, a second inductor paired on a core with the first inductor, and a half bridge rectifier circuit coupled with the second inductor, to generate a direct current output across an output capacitor; wherein the half bridge rectifier circuit comprises:
a first diode and a first capacitor connected to the second inductor to form a first loop to allow electric current to go through the inductor in a first direction; and
a second diode and a second capacitor connected to the second inductor to form a second loop to allow electric current to go through the inductor in a second direction, wherein the first and second capacitors are series connected with the output capacitor;
wherein the step-up converter is coupled to the voltage bus across the series connected first, second and output capacitors.

15. The system of claim 14, wherein the voltage bus has a voltage equal to or above 200 volts; and the boost converter operates under 50 volts.

16. The system of claim 14, wherein the direct current energy sources comprise solar panels.

17. The system of claim 14, wherein the boost converter includes a trench transistor having less than ten milliohms in resistance between drain and source when the transistor is on.

* * * * *